(12) United States Patent
Moerke et al.

(10) Patent No.: US 6,698,700 B2
(45) Date of Patent: Mar. 2, 2004

(54) FASTENER FOR SIMPLE HOLES

(75) Inventors: Benjamin H. Moerke, Chippewa Falls, WI (US); Edward P. Massof, Washington Township, MI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/350,695

(22) Filed: Jan. 24, 2003

(65) Prior Publication Data

US 2003/0183735 A1 Oct. 2, 2003

Related U.S. Application Data

(60) Provisional application No. 60/367,551, filed on Mar. 26, 2002.

(51) Int. Cl.[7] ............................................. A47B 96/00
(52) U.S. Cl. .............................. 248/220.31; 248/222.11; 248/222.51; 248/224.8; 248/304
(58) Field of Search ...................... 248/220.31, 222.51, 248/304, 222.11, 223.41, 224.8, 225.21

(56) References Cited

U.S. PATENT DOCUMENTS 2,618,033 A * 11/1952 Tinnerman et al. ........ 248/68.1
3,954,243 A * 5/1976 Sharp et al. ................ 248/235
4,103,854 A * 8/1978 Pliml et al. ................. 248/235

FOREIGN PATENT DOCUMENTS

AT 258524 A 11/1967

* cited by examiner

*Primary Examiner*—Korie Chan
(74) *Attorney, Agent, or Firm*—Mark W. Croll; Paul F. Donovan

(57) ABSTRACT

A molded fastener for securing an object to a support is herein disclosed. The fastener is capable of bearing tension, shear, and bending stresses and may be installed in a simple aperture or hole formed in the support. The fastener is comprised of a base member from which extends an attachment structure that is adapted to secure to the fastener an object and a hooked tail that is passed through the simple aperture formed in the support to secure the fastener, and hence the object, to the support. A retention member of the fastener prevents the withdrawal of the fastener from the simple aperture by resisting withdrawal forces substantially in compression.

5 Claims, 1 Drawing Sheet

FASTENER FOR SIMPLE HOLES

CROSS REFERENCE TO RELATED APPLICATIONS

This U.S. Non-Provisional Application claims the benefit of U.S. Provisional Application Serial No. 60/367,551 filed on Mar. 26, 2002 and entitled High Strength Fastener for Simple Holes.

FIELD OF THE INVENTION

The present application relates to a molded resilient fastener for securing an object to a support.

BACKGROUND OF THE INVENTION

Typical prior art molded fasteners are designed to resist tensile and or shear stresses. But in general, these fasteners do not resist bending stresses all that well. In response, various structures have been developed to resist bending stresses. However, these structures typically require that relatively complex apertures or holes be formed in the support to allow the fastener to be secured thereto. In many instances, these complex apertures are not feasible and in any case, require special tooling and set up that increases the cost of manufacturing. Accordingly, it is a feature of the present invention to simplify the type of aperture or hole needed to secure a molded fastener to a support. Another feature is to provide a fastener that resists bending stresses applied thereto.

These and other features, aspects and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

SUMMARY OF THE INVENTION

The features of the present invention are realized in a fastener for securing an object to a support that comprises a base member with a hooked tail, an attachment structure, and a retention member. The base member of the fastener has a first side and a second side. The attachment structure of the fastener extends from the first side of the base member and the hooked tail extends from the second side of the base member. Note that the attachment structure is constructed and arranged to secure the object to the fastener. The hooked tail is constructed and arranged to extend through a hole formed through the support in such a way that the end of the tail will resiliently contact the under surface of the support as the base member contacts the upper surface of the support. The retention member of the fastener is housed at least partially within a recess formed in the hooked tail near where the tail attaches to the base member. The root end of the retention member is secured within the recess. The tip of the retention member has a groove that engages an interior surface of the hole through which the hooked tail is inserted. The retention member is furthermore arranged such that any forces that would tend to withdraw the hooked tail of the fastener from the hole will be resisted substantially in compression.

The hole through which the hooked tail is inserted has a simple geometric shape that may be chosen from a group that comprises a circle, a square, a rectangle, a triangle, a hexagon, and an oval, or any other suitable shape. Note that the tail of the fastener is suitably adapted to be inserted through the hole and may be either curvilinear or rectilinear in shape or any other suitable shape. Furthermore, the cross-sectional area and shape of the hooked tail may be consistent over the length of the tail, or may vary in either size or shape along the length of the tail.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
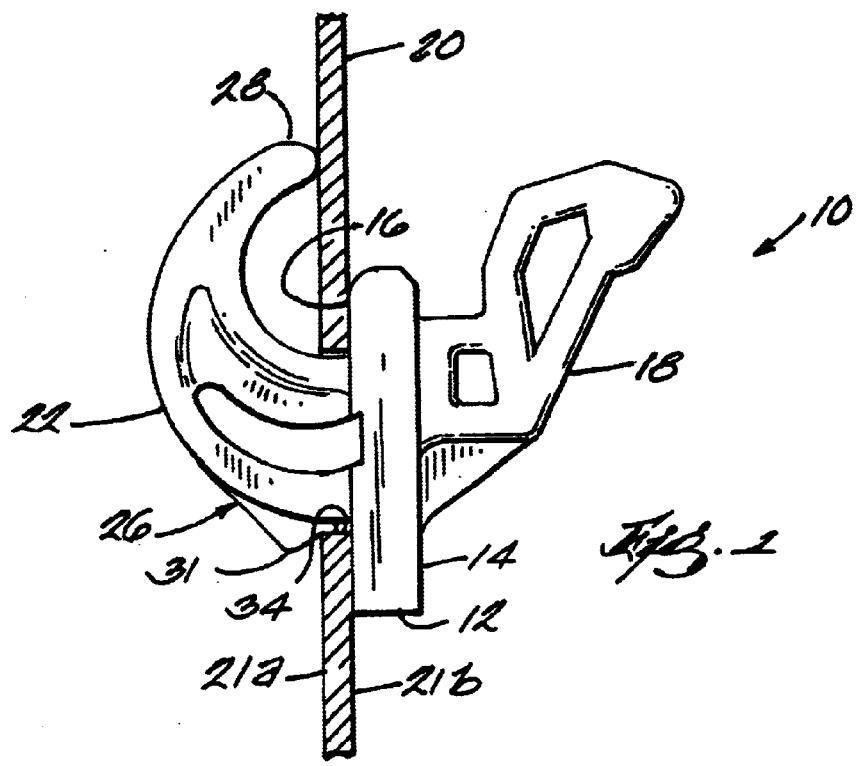
FIG. 1 is a side view of the fastener of the present invention shown in its installed position.

FIG. 1 illustrates a fastener 10 constructed according to the principles of the present invention. Fastener 10 comprises a base member 12 having a first side 14 and a second side 16. Extending from the first side 14 of the base member 12 is an attachment structure 18 useful in securing an object (not shown) to a support 20. The base member 12 has a hooked tail 22 extending from its second side 16. This hooked tail 22 is constructed and arranged to be inserted through a simple hole or aperture 24 formed through the support 20. A retention member 26 acts to secure the hooked tail 22 of the fastener 10 within the hole 24. The fastener 10 of the present invention is preferably fashioned as by molding from a relatively resilient thermoplastic or thermosetting material, though it is to be understood that the fastener 10 might be machined or forged in a metal of a suitable sort as the need arises. In addition, the fastener 10 may be strengthened by the use of a suitable insert (not shown) or by the addition of a reinforcing fiber such as glass or ceramic fibers.

In a preferred embodiment of the present invention, the hooked tail 22 is constructed and arranged to be received through a rectangular hole 24. As used herein, unless otherwise indicated, the term "simple" refers to an aperture 24 having a shape that may be described as a square, a rectangle, a triangle, or a polygon having n sides. Note that the number of sides n of the polygon that defines the hole 24 must be sufficiently low that the exterior surface of the hooked tail 22 will engage at least one of the n sides of the interior surface of the hole 24 so as to prevent relative rotation therebetween. In an alternative embodiment, the hole 24 may have a round shape with, if necessary, an additional structural member provided to prevent relative rotation.

Figure 3:
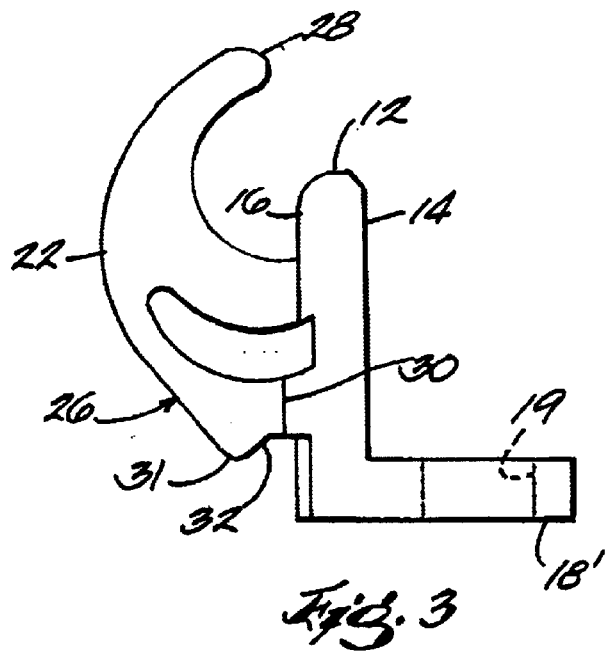
FIG. 3 is a partial cross-section of the fastener taken along cutting lines 3—3 of FIG. 2.

Preferably the hooked tail 22 will have a curvilinear shape as shown in FIGS. 1 and 3. However, it is to be understood that the hooked tail 22 may be rectilinear and comprised of two or more segments that are functionally equivalent with the curvilinear hooked tail 22 illustrated in the figures. Similarly, the contours and cross-sectional area of the hooked tail 22 may be consistent along its entire length or may be tapering in a cross-section over its entire length in either a continuous or a discontinuous manner.

The hooked tail 22 acts in conjunction with the retention member 26 to secure the base member 12 to the support 20 at hole 24. As can be seen in FIG. 1, the tip 28 of the hooked tail 22 contacts the undersurface 21a of the support 20 at the same time that the second surface 16 of the base member 12 contacts the second side 21b of the support member 20. In a preferred embodiment of the present invention, the hooked tail 22 will be constructed and arranged such that in order for the base member 12 and the tip 28 of the hooked tail 22 to simultaneously contact the respective sides of the support 20, the hooked tail 22 must be resiliently deflected away from the base member 12. Alternatively, the tail 22 can be relatively rigid. In order to prevent the resilient biasing of the hooked tail 22 away from the base member 12 from forcing the tail 22 from the hole 24, the tip 30 of the retention member 26 will engage an edge of the hole 24. To facilitate this engagement, the tip 30 of the retention member 26 is provided with a suitably shaped groove 32 that allows the tip 30 to engage the edge of the hole 24 as seen in FIG. 1. The engagement of the retention member 26 with the hole 24 maintains the hooked tail 22 in its resiliently biased state and insures a solid connection between the support 20 and the fastener 10. A feature of the invention is that the fastener 10 is capable of use in conjunction with support 20 that can have widths or thicknesses of various dimensions.

Figure 2:
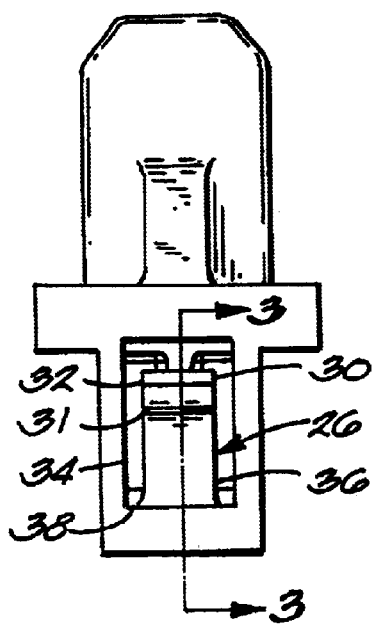
FIG. 2 is a top view of the fastener of FIG. 1.

The retention member 26, as seen in FIG. 2, will preferably extend from an aperture 34 formed in the hooked tail 22. A base 36 of the retention member is secured to a bottom surface 38 of the aperture 34. The retention member 26 is essentially a cantilever structure capable of being resiliently biased inwardly toward the main body of the hooked tail 22 as occurs when the hooked tail 22 is inserted through the hole 24. Specifically, as the hooked tail 22 is inserted through the hole 24, the hole 24 will bear against the outer surface of the retention member 26 and bias it inwardly into the aperture 34 such that the entirety of the hooked tail 22 may be inserted into the hole 24. Note that after a detent portion 31 of the retention member 26 has passed through the hole 24, the retention member 26 will return to its initial position as illustrated in FIG. 1 such that the groove 32 in the tip 30 may engage the hole 24 as shown. FIG. 3 illustrates a complete cross-section of the retention member 26 taken along cutting lines 3—3 of FIG. 2.

The retention member 26 is constructed and arranged to extend from the aperture 34 in such a way that forces tending to withdraw the hooked tail 22 will be opposed substantially in compression. In this way, the relatively resilient retention member 26 may be easily displaced as the hooked tail 22 is inserted through the hole 24, yet resist substantial forces that would tend to withdraw the hooked tail 22 from the hole 24.

It is to be understood that the attachment mechanism 18 of the fastener 10 may be adapted to secure any one of a number of objects to the support 20. For example, the attachment structure 18 can be adapted to secure various structures to an automobile trim member or frame member or other suitable member. While FIGS. 1 and 2 illustrate a preferred embodiment of the attachment structure 18, FIG. 3 illustrates an attachment structure 18' that comprises a tab having a bore 19 formed therethrough. Structure 18 can be of any number of different shapes and configurations, depending on the desired application.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fastener for securing an object to a support comprising:

a base member having a flange with a first side and a second side, the first side of the base member having an attachment structure that is constructed and arranged to secure the object to the fastener extending therefrom;

a hooked tail extending from the second side of the flange, the tail being constructed and arranged to extend through a hole formed through the support, such that an end of the tail resiliently contacts an under surface of the support as the base member contacts an upper surface of the support that is opposite the under surface; and, a retention member housed at least partially within a recess formed in the tail near the base member, the retention member being secured at its root end within the recess and having a tip comprising a groove, the tip of the retention member extending from the recess toward the base member such that the groove in the tip engages an interior surface of the hole formed through the support when the tail is fully inserted into the hole in the support.

2. The fastener for securing an object to a support of claim 1 wherein the hole has a simple geometric shape chosen from a group comprising of a circle, a square, a rectangle, a triangle, a hexagon, and an oval, the tail of the fastener being suitably adapted to be inserted through the hole.

3. The fastener for securing an object to a support of claim 1 wherein the tail is curvilinear in form.

4. The fastener for securing an object to a support of claim 1 wherein the tail is tapered over its length from its base to its tip.

5. The fastener for securing an object to a support of claim 1 wherein the retention member engages the interior surface of the hole in such a manner as to resist forces that would tend to withdraw the fastener from the hole and does so substantially in compression.

* * * * *